(12) United States Patent
Janke et al.

(10) Patent No.: US 9,342,685 B2
(45) Date of Patent: May 17, 2016

(54) ELECTRIC CIRCUIT AND TERMINAL

(75) Inventors: Marcus Janke, Munich (DE); Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 2169 days.

(21) Appl. No.: 11/682,984

(22) Filed: Mar. 7, 2007

(65) Prior Publication Data

US 2008/0022398 A1    Jan. 24, 2008

(30) Foreign Application Priority Data

Mar. 7, 2006  (DE) .......................... 10 2006 010 514

(51) Int. Cl.
*G06F 21/44* (2013.01)
*G06F 21/55* (2013.01)
*G06K 19/073* (2006.01)

(52) U.S. Cl.
CPC ............ *G06F 21/445* (2013.01); *G06F 21/558* (2013.01); *G06K 19/073* (2013.01)

(58) Field of Classification Search
CPC .... G06F 21/445; G06F 21/558; G06K 19/073
USPC .......... 713/194; 726/20, 34; 257/686
See application file for complete search history.

(56) References Cited

U.S. PATENT DOCUMENTS

| | | | | |
|---|---|---|---|---|
| 5,247,164 | A * | 9/1993 | Takahashi .................. | 235/492 |
| 5,761,144 | A | 6/1998 | Fukuzumi et al. | |
| 6,031,279 | A | 2/2000 | Lenz et al. | |
| 6,094,527 | A * | 7/2000 | Tsukamoto et al. ............ | 703/18 |
| 6,237,848 | B1 * | 5/2001 | Everett ............................ | 235/380 |
| 6,706,557 | B2 | 3/2004 | Koopmans | |
| 6,724,296 | B1 * | 4/2004 | Hikita et al. ................. | 340/5.61 |
| 6,907,526 | B2 * | 6/2005 | Tanimoto et al. ............. | 713/174 |
| 7,251,734 | B2 * | 7/2007 | Blangy ................. | G06F 21/558 |
| | | | | 708/250 |
| 7,302,572 | B2 * | 11/2007 | Shinriki et al. ............... | 713/172 |
| 7,343,276 | B1 * | 3/2008 | Tsukamoto et al. ............ | 703/18 |
| 2002/0074637 | A1 | 6/2002 | McFarland | |
| 2004/0028234 | A1 * | 2/2004 | Wuidart ........................ | 380/287 |
| 2004/0169081 | A1 * | 9/2004 | Azuma .......................... | 235/451 |
| 2005/0055563 | A1 * | 3/2005 | Fischer et al. ................. | 713/194 |

FOREIGN PATENT DOCUMENTS

| | | |
|---|---|---|
| DE | 196 15 394 C2 | 4/1997 |
| DE | 196 35 582 C1 | 2/1998 |
| DE | 10 2004 021 054 A1 | 11/2005 |

OTHER PUBLICATIONS

Abrial, Andrée, et al. "A new contactless smart card IC using an on-chip antenna and an asynchronous microcontroller." Solid-State Circuits, IEEE Journal of 36.7 (2001): 1101-1107.*
Vacherand, François. "New technologies for contactless microsystems." Proceedings of the 2005 joint conference on Smart objects and ambient intelligence: innovative context-aware services: usages and technologies. (pp. 13-17). ACM, 2005.*

* cited by examiner

*Primary Examiner* — Kari Schmidt
(74) *Attorney, Agent, or Firm* — Schiff Hardin LLP

(57) ABSTRACT

In a system, there is communication between an electric circuit and a terminal within a scope of a terminal session, wherein the electric circuit has a current consumer for causing additional current consumption, and the terminal has a current consumption meter detecting the current consumption of the electric circuit and coupled to a checker checking authenticity of the electric circuit if the current consumption of the electric circuit has additional current consumption.

16 Claims, 1 Drawing Sheet

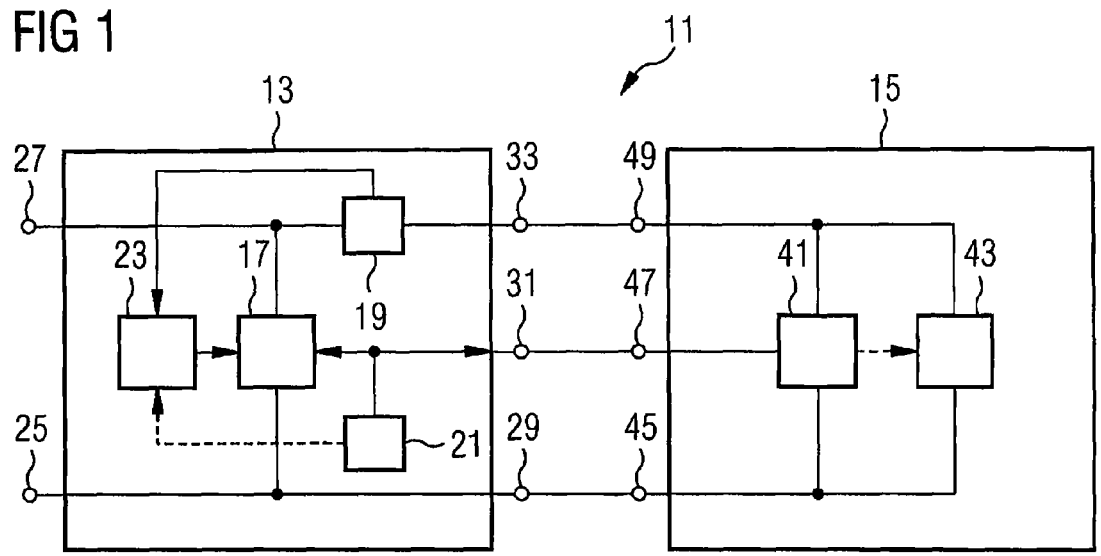
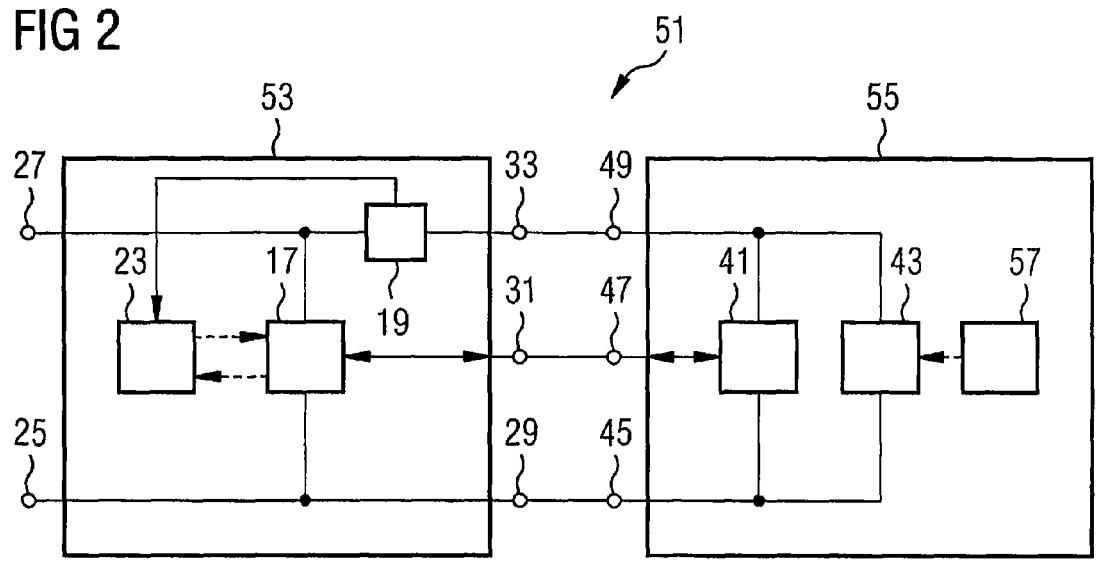

ELECTRIC CIRCUIT AND TERMINAL

CROSS-REFERENCE TO RELATED APPLICATIONS

This application claims priority from German Patent Application No. 102006010514.1, which was filed on Mar. 7, 2006, and is incorporated herein by reference in its entirety.

TECHNICAL FIELD

The present invention relates to an electric circuit for the communication with a terminal, the terminal for the communication with the electric circuit, and a system including both. Moreover, the present invention relates to a method of operating the electric circuit and a method of operating the terminal, wherein the electric circuit and the terminal communicate with each other within the scope of a terminal session.

BACKGROUND

Security controllers more and more frequently are employed in a series of applications, such as chip-card ICs (integrated circuits), that is chips or semiconductor devices with an integrated circuit arrangement.

Here, the security controllers are applied to carry out a security-relevant operation, such as authentication of a user, on a chip-card IC, for example, such as a money-card IC. For this, it is necessary that a device or terminal communicating with the security controller implemented in the chip-card IC can recognize genuineness or authenticity of the security controller.

A general problem in the application of security controllers in chip cards, such as here in SIM (subscriber identification module) cards, consists in the fact that emulation of the cards by employment of a freely programmable controller feigning the function or functions of the original card virtually cannot be detected. If a chip card performs logically as prescribed, or executes the logic operations according to the specification or the prescribed communication protocol, it is accepted as genuine or authentic by a device or terminal or chip-card terminal communicating with the chip card.

In order to improve the detection or the recognition of genuineness of a security controller, it is possible to equip security controllers, apart from a logic means for outputting logic signals, also with circuit elements capable of outputting, at an input/output port, an analog signal, which may then be tested and evaluated by the chip-card terminal. Since an emulator cannot provide this analog signal, or only with extremely high external circuit overhead, emulation or replication of this analog signal is very intensive.

At the same time, however, testing the analog signal generated by the circuit elements is also very intensive, because new circuit elements performing evaluation of the analog signal are to be implemented in the chip-card terminal. Thus, significant overhead is necessary or significant reconstruction of existing chip-card terminals is necessary, to test a circuit, as outlined above, or such a security controller, which is arranged on a chip card, for genuineness by means of the analog signal output from the conventional circuit. In particular, each existing terminal that is supposed to read out or check such a hardware characteristic, namely the analog signal output from the circuit element, would have to be completely reconstructed, so that the terminal can be operated so that it can recognize or evaluate the analog signal. Thus, operation of the conventional electric circuit in the chip card, as well as operation of the conventional terminal is very intensive.

BRIEF DESCRIPTION OF THE DRAWINGS

Preferred embodiments of the present invention will be detailed subsequently referring to the appended drawings, in which:

FIG. 1 shows a system according to a first embodiment, comprised of a terminal and a chip with an electric circuit; and FIG. 2 shows a system according to a second embodiment, comprised of a terminal and a chip with an electric circuit.

DETAILED DESCRIPTION

According to an embodiment, an electric circuit for communication with a terminal within a scope of a terminal session may have: an operation unit for performing logic operations in connection with the terminal session; and a current consumer, which can be activated by the terminal to cause additional current consumption to a current consumption of the operation unit, such that the logic operations are independent of electric processes underlying the additional current consumption.

According to another embodiment, an electric circuit for communication with a terminal within a scope of a terminal session may have: an operation unit for performing logic operations in connection with the terminal session; a current consumer, which can be activated to cause additional current consumption to current consumption of the operation unit, such that the logic operations are independent of the additional current consumption; and a current consumption activator for activating the current consumer in a manner predictable for the terminal.

According to another embodiment, a terminal for communication with an electric circuit within a scope of a terminal session may have: an activator for transmitting an activation signal to the circuit; a current consumption meter for detecting current consumption of the electric circuit; and a checker, coupled to the current consumption meter, for checking whether the current consumption of the electric circuit has an additional current consumption upon the activation signal, and for determining authenticity of the electric circuit if this is the case.

According to another embodiment, a terminal for communication with an electric circuit within a scope of a terminal session may have: a current consumption meter for determining current consumption of the electric circuit; and a checker, coupled to the current consumption meter, for checking whether the current consumption of the electric circuit has additional current consumption in predictable manner, and for determining authenticity of the electric circuit if this is the case.

According to another embodiment, a system may have: an electric circuit for communication with a terminal within a scope of a terminal session, having: a current consumer, which can be activated by the terminal to cause additional current consumption of the electric circuit; and the terminal, having: an activator for transmitting an activation signal to the circuit; a current consumption meter for detecting current consumption of the electric circuit; and a checker, coupled to the current consumption meter, for checking whether the current consumption of the electric circuit has an additional current consumption upon the activation signal, and for determining authenticity of the electric circuit if this is the case.

According to another embodiment, a system may have: a electric circuit for communication with a terminal within a scope of a terminal session, having: a current consumption activator for activating a current consumer in a manner predictable for the terminal; and the current consumer, for causing additional current consumption; and the terminal, having: a current consumption meter for detecting current consumption of the electric circuit; and a checker, coupled to the current consumption meter, for checking whether the current consumption of the electric circuit has additional current consumption upon the activation signal, and for determining authenticity of the electric circuit if this is the case.

According to another embodiment, a method of operating an electric circuit for communication with a terminal within the scope of a terminal session, wherein the electric circuit has an operation unit for performing logic operations in connection with the terminal session, and a current consumer, which can be activated to cause additional current consumption to a current consumption of the operation unit, such that the logic operations are independent of electric processes underlying the additional current consumption, may have the steps of: receiving a current consumption activation signal; and activating the current consumer upon receipt of the current consumption activation signal.

According to another embodiment, a method of operating an electric circuit for communication with a terminal within a scope of a terminal session, wherein the electric circuit has an operation unit for performing logic operations in connection with the terminal session, and a current consumer, which can be activated to cause additional current consumption to a current consumption of the operation unit, such that the logic operations are independent of electric processes underlying the additional current consumption, may have the step of: activating the current consumer in a manner predictable for the terminal.

According to another embodiment, a method of operating a terminal for communication with an electric circuit within a scope of a terminal session may have the steps of: transmitting an activation signal to the electric circuit; checking whether current consumption of the electric circuit has additional current consumption upon transmitting the activation signal; and determining authenticity of the electric circuit if it turns out in the step of checking that the electric circuit has the additional current consumption upon transmitting the activation signal.

According to another embodiment, a method of operating a terminal for communication with an electric circuit within a scope of a terminal session may have the steps of: detecting current consumption of the electric circuit; checking whether current consumption of the electric circuit has additional current consumption in a predictable manner; and determining authenticity of the electric circuit if it turns out in the step of checking that the current consumption of the electric circuit has the additional current consumption in predictable manner.

According to another embodiment, a computer program product may have program code stored on a machine-readable carrier for performing, when the computer program is executed on a computer, a method of operating an electric circuit for communication with a terminal within a scope of a terminal session, wherein the electric circuit has an operation unit for performing logic operations in connection with the terminal session, and a current consumer, which can be activated to cause additional current consumption to a current consumption of the operation unit, such that the logic operations are independent of electric processes underlying the additional current consumption, wherein the method may have the steps of: receiving a current consumption activation signal; and activating the current consumer upon receipt of the current consumption activation signal.

According to another embodiment, a computer program product may have program code stored on a machine-readable carrier for performing, when the computer program is executed on a computer, a method of operating an electric circuit for communication with a terminal within a scope of a terminal session, wherein the electric circuit has an operation unit for performing logic operations in connection with the terminal session, and a current consumer, which can be activated to cause additional current consumption to a current consumption of the operation unit, such that the logic operations are independent of electric processes underlying the additional current consumption, wherein the method may have the step of: activating the current consumer in a manner predictable for the terminal.

According to another embodiment, a computer program product may have program code stored on a machine-readable carrier for performing, when the computer program is executed on a computer, a method of operating a terminal for communication with an electric circuit within a scope of a terminal session, wherein the method may have the steps of: transmitting an activation signal to the electric circuit; checking whether current consumption of the electric circuit has additional current consumption upon transmitting the activation signal; and determining authenticity of the electric circuit if it turns out in the step of checking that the electric circuit has the additional current consumption upon transmitting the activation signal.

According to another embodiment, a computer program product may have program code stored on a machine-readable carrier for performing, when the computer program is executed on a computer, a method of operating a terminal for communication with an electric circuit within a scope of a terminal session, wherein the method may have the steps of: detecting current consumption of the electric circuit; checking whether current consumption of the electric circuit has additional current consumption in a predictable manner; and determining authenticity of the electric circuit if it turns out in the step of checking that the current consumption of the electric circuit has the additional current consumption in predictable manner.

The present invention is based on the finding that, in an electric circuit communicating with a terminal, by a current consumption means, which can be activated by the terminal or by a current consumption activation means arranged in the electric circuit in a manner predictable for the terminal, such as a pattern recognizable for the terminal or an identification pattern recognizable for the terminal, or at a time instant or pattern time instant predictable for the terminal, additional current consumption can be caused in such a manner that the terminal communicating with the electric circuit can check whether the current consumption of the electric circuit is increased, and if this is the case, can determine authenticity of the circuit on the basis of the additional current consumption of the circuit, with the effort being small, because no analog signal transmission between the terminal and the electric circuit has to be realized, and current measuring means often are already present in a terminal, such as a card reader of a bank or a cellphone.

Thereby, the terminal is capable of determining the authenticity of an electric circuit, such as a security controller e.g. employed in a SIM card. By means of a command sent to the security controller or chip-card controller from the terminal, the security controller can activate or deactivate a current consumption means, so that the security controller or the electric circuit consumes a current that is higher by a certain magnitude, upon request or upon sending the command from the terminal to the chip-card controller.

Here, the terminal has a means capable of measuring current flowing to the chip card or current flowing into the terminal altogether. Here, it is advantageous that for example mobile phones shipped today in most cases already comprise a current counter indicating how much current or mA or milliamperes is consumed at the moment or presently. The terminal may then activate the current consumer or the additional current consumption means, which may for example be implemented on an electric circuit applied on the card, and check the correct function or the authenticity of the circuit on the basis of the additional current consumption and thus check the authenticity of the card.

Based on a standard circuit capable of imitating the logic operations in connection with the terminal session, it is not possible, without additional external circuitry, to emulate the behavior or the additional current consumption as a result of the signal transmitted to the electric circuit from the terminal, in particular so that the forgery or the attempt of the emulation of the security controller would not be recognized in the terminal. For example, the terminal may prevent the execution of dedicated safety-critical operations, such as debiting functions or the performance of cryptographic algorithms, if it recognizes an imitating circuit. Thus, security of an electric circuit communicating with a terminal within the scope of a terminal session, or the security of operation of a terminal communicating with the circuit, or the security of a system including both the terminal and the circuit communicating with the terminal can be guaranteed in simple manner.

In one embodiment, it is especially advantageous that the current consumption means may optionally be adjusted to a value via a signal transmitted to the electric circuit from the terminal, so that an authenticity feature of the electric circuit can be recognized in better way or imitation be unmasked more easily. Here, the electric circuit or the security controller comprises e.g. a current consumer programmable to one or more fixed values, which may for example be embodied in form of a plurality of load transistors, such as in a CURSE (current scrambling engine) means or a current scrambling unit. By means of a command transmitted to the electric circuit from the terminal or the activation command from the terminal, the current supplied from the current consumption means may be adjusted correspondingly to one of the fixed or default values.

In a further embodiment, the electric circuit for the communication with the terminal comprises a current consumption activation means activating the current consumption means in a manner predictable for the terminal, such as in a pattern or identification pattern predictable for the terminal, and/or at a time instant predictable for the terminal, so that transmitting a signal from the terminal to the electric circuit is no longer necessary. Here, the terminal may check or determine authenticity of the electric circuit on the basis of the additional current consumption detected in the predictable pattern. Here, it is advantageous that a conventional terminal communicating with the electric circuit and often already having a current measuring device preinstalled, which detects the current consumption of the electric circuit, can be retrofitted again in very simple manner so that it can recognize the additional current consumption of the electric circuit and check and evaluate the authenticity feature of the circuit thus implemented.

In FIG. 1, a system 11 according to a first embodiment is shown, which comprises a terminal 13 for the communication with an electric circuit, as well as a chip 15, into which the electric circuit is integrated.

The terminal 13 comprises a terminal processing unit 17, a current consumption measuring unit 19, an activation unit 21, and a checking unit 23. The terminal 13 further includes a first terminal supply port 25, a second terminal supply port 27, a terminal ground port 29, a terminal input/output (I/O) port 31, and a terminal circuit supply port 33.

The chip 15 with the electric circuit according to a first embodiment comprises an operation unit 41 and a current consumption unit 43. Moreover, the chip 15 includes a chip ground port 45, a chip input/output port 47, and a chip supply port 49.

In the terminal 13, the terminal processing unit 17 is connected between the first terminal supply port 25 and the second terminal supply port 27 and connected to the terminal I/O port 31 in electrically conducting manner. Here, bi-directional communication, that is both transmission of information from the terminal 13 to the electric circuit 15 and vice versa, can be performed via the terminal I/O port 31. The current consumption measuring unit 19 is connected between the terminal circuit supply port 33 and the second terminal supply port 27.

On the chip 15, the operation unit 41 is connected between the chip supply port 49 and the chip ground port 45 and coupled the chip I/O port 47, wherein bi-directional communication can be carried out via the chip I/O port 47. During a terminal session, the terminal ground port 29 is connected to the chip ground port 45, the terminal I/O port 31 to the chip I/O port 47, and the terminal circuit supply port 31 to the chip supply port 49 in electrically conducting manner, wherein the electric circuit and the terminal 13 communicate via their I/O ports in a terminal session.

Voltage supply and/or energy supply of the terminal 13 as well as the chip or the electric circuit 15 takes place via the terminal supply ports 25, 27. The current consumption measuring unit 19 is capable of detecting current consumption of the chip 15. The terminal processing unit 17 communicates with the operation unit 41 via the electric connection between the terminal I/O port 31 and the chip I/O port 47 shown in FIG. 1.

During a terminal session, the terminal processing unit 17, which may be embodied as a logic circuit, and the operating unit 41 exchange data, wherein the operation unit 41 performs logic operations within the scope of the terminal session. The logic operations, for example, include encrypting a word received from the terminal processing unit 17 or transmitting an authentication feature of a logic authentication feature to the terminal processing unit 17. The terminal processing unit 17, which may also be embodied as a logic circuit, determines, among other things, authenticity of the electric circuit implemented on the chip 15 on the basis of the data received from the operation unit 41 via the I/O ports, such as a logic identification feature.

The elements described in the following serve to enable the terminal 13 to detect or check an authenticity feature of the electric circuit on the chip 15 in simple manner, wherein the check of the authenticity feature takes place in addition to the check of the logic authentication feature in the terminal 13. In the terminal 13 according to the present invention, to this end, the checking unit 23 is coupled to the current consumption measuring unit 19, and the activation unit 21 is connected to the terminal I/O port 31 in electrically conducting manner, so that the activation unit 21 can transmit an activation signal to the operation unit 41. Moreover, the activation unit 21 transmits a signal to the checking unit 23, so that the checking unit 23, on the basis of the transmitted signal, gets to know that and/or when the activation unit 21 transmits or has transmitted the activation signal to the operation unit 41. The current consumption unit 43 is connected between the chip ground port 45 and the chip supply port 49 and is activated by means of a current consumption unit activation signal transmitted to the current consumption unit 43 from the operation unit 41 upon the reception of the activation signal from the terminal.

Via the activation signal, the activation unit 21 tells the operation unit 41 that the operation unit 41 is to activate the current consumption unit 43 via the current consumption unit activation signal. Upon receiving the current consumption unit activation signal from the operation unit 41, the current consumption unit 43 generates additional current consumption, which is independent and/or uninfluenced by the electric processes performed by the operation unit 41 and/or the electric processes underlying the logic operations performed by the operation unit, and conversely also leaves the logic state of the operation unit uninfluenced. Thus, the current consumption unit 43 can be activated from the outside or from the terminal 13 via the chip I/O port 47. Upon activating, the current consumption of the chip 15 then is increased by the additional current consumption as opposed to a state in which the current consumer is not activated or is deactivated.

The fact that the current consumption unit is activated or is deactivated and the electric processes in this connection have no effects whatsoever on the logic operations taking place in connection with the terminal session and executed by the operation unit 41, so that the initial logic state of the electric circuit, when it performs the next terminal session, i.e. after ending the session in progress and beginning of the next one, is uninfluenced by activating or deactivating the current consumption unit or the fact that the current consumption unit has adjusted the additional current consumption of the electric circuit or not.

Advantageously, the current consumption unit increases the current consumption of the chip 15 a fixed predetermined time duration after obtaining an activation signal from the terminal, uninfluenced by the fact of which logic operations are currently being performed within the scope of the terminal session, and which logic operations the operation unit is currently executing in connection with the terminal session.

In the circuit 15, the operation unit may e.g. be embodied as an arbitrary logic circuit, such as a processor on which a program for performing the logic operations in connection with the terminal session is running.

The processor or the controller 41 may be formed such that it interrupts the normal program flow for processing the program for performing the logic operations in connection with the terminal session by means of an interrupt signal upon obtaining or receiving the activation signal from the terminal 13, in order to forward the activation signal to the current consumption unit 43 as immediately as possible upon the activation signal received from the terminal, and thus activate the current consumption unit 43. In this manner, it is guaranteed that the terminal, in a foreseeable time interval after the output of its activation signal to the chip 15, can count on the fact that the chip increases its current consumption upon the reception of this activation signal, independently of the controller tasks of the controller 51 that are to be done at the moment.

The additional current consumption of the chip 15 or the electric circuit on the chip 15 is detected by means of the current consumption measuring unit 19. The checking unit 23 may read out a value about the present current consumption from the current consumption measuring unit. Since the checking unit 23 is at the same time informed on the time instant of activating the current consumption unit 43 via the activation signal received from the activation unit 21, the checking unit 23 is capable of comparing current consumption of the electric circuit prior to activating the current consumption unit 43 to current consumption of the electric circuit on the chip 15 after activating the current consumption unit 43, and of determining the additional current consumption of the electric circuit 15 caused by the current consumption unit 43 based on the comparison or a difference formation.

If the checking unit 23 determines that the current consumption is increased upon transmitting the activation signal from the activation unit 21 to the electric circuit in the chip 15, the checking unit 23 may infer authenticity of the electric circuit on the chip 15 on the basis of the increase of the current consumption of the circuit in the chip 15 or the additional current consumption. The checking unit 23 additionally compares the determined additional current consumption, for example, to a minimum or target value deposited in a register of the checking unit 23, for example, and determines, based on the comparison, whether the circuit on the chip comprises the specified or predefined authenticity feature or not.

Then, the checking unit 23 transmits the result of the check of the authenticity feature to the terminal processing unit 17 via a check signal. On the basis of the check signal, the terminal processing unit 17 is informed whether the circuit implemented on the chip is genuine or not or comprises the authenticity feature or not. If the terminal processing unit 17 gets to know that the electric circuit on the chip 15 does not comprise the authenticity feature, it thereupon prevents e.g. performing safety-critical functions, such as debiting functions or cryptographic algorithms, or immediately cancels execution of the safety-critical functions or the terminal session altogether, such as by interrupting the current supply to the chip 15.

It is advantageous that both the activation unit 21 and the checking unit 23 can be implemented in a terminal in simple manner. For example, implementation of the functionalities of the activation unit 21 and the checking unit 23 in an already present terminal processing unit 17 often is already sufficient, because a current consumption measuring unit 19 already is present in many conventional terminals. Thus, re-equipment of a conventional terminal to the terminal 13 is possible in simple manner, so that the arising terminal 13 can perform an additional check of the authenticity of the chip 15 or of the circuit implemented on the chip 15. On the chip 15 itself, also only one additional current consumer is to be implemented, which may for example be embodied as one or more load transistors, which may be connected individually, if necessary, and which is/are controlled by the operation unit 41 and connected to the current supply between the ports 49 and 45.

In the illustration of the above embodiment, it was previously only gone into the onset or the beginning of the additional current consumption upon the activation signal from the terminal. The subsequent duration of the started additional current consumption in the chip may either be adjusted to a predefined value known both to the chip and to the terminal a priori, so that the chip performs the additional current consumption for this duration and the terminal expects this additional current consumption for this time duration, or the duration is determined by the terminal in a manner similar to the beginning of the additional current consumption, namely by transmitting a deactivation signal to the chip, whereupon the operation unit in the chip notifies the current consumption unit of the command of the terminal that the additional current consumption is to be ended, and the checking unit expects and/or checks the end of the additional current consumption.

In FIG. 2, a system 51 according to a second embodiment is shown, which includes a terminal 53 and a chip 55 with an electric circuit. Here, the same or similarly acting elements as in the system 11 shown in FIG. 1 are provided with the same reference numerals. Moreover, the illustration of the construction and the functionality of the system 51 is limited to only a description of the change of the construction and the functionality relative to the embodiment shown in FIG. 1.

In contrast to the embodiment shown in FIG. 1, the activation unit 21 is omitted in the terminal 53 according to the present invention, whereas the circuit on the chip 55 additionally comprises a current consumption triggering unit 57.

The current consumption triggering unit 57 generates a trigger signal received by the current consumption unit 41, so that activation of the current consumption unit 43 takes place in a manner predictable for the terminal 53, such as in a time relation to the logic operations executed by the operation unit 41, which is predictable for the terminal, or in an identification pattern predictable and recognizable for the same. Synchronization between the terminal processing unit 17 and the operation unit 41, and thus between the terminal 53 and the electric circuit on the chip 55, may take place via the electric circuit existing between the terminal I/O port 31 and the chip I/O port 47 and the electric signals transmitted on this connection. It is conceivable that the operation unit 41 transmits a logic indication signal to the terminal processing unit 17 and therewith tells the terminal processing unit 17 that, upon the elapse of a certain time interval, the current consumption unit 19 will increase the current consumption of the electric circuit. But it is also possible that the operation unit 41 extracts an internal clock from a clock signal provided from the terminal, such as an external clock terminal of the chip 55 especially provided for this, and that the current consumption triggering unit disposes of a synchronizing unit not shown in FIG. 2, which activates the current consumption unit 43 at fixed time instants known to the terminal or fixed time durations after the terminal session beginning based on the internal clock and a detected time instant of the beginning of the current terminal session. The external clock could also be superimposed on the current consumption signal. Of course, it is also conceivable that the current consumption triggering unit 57 activates the current consumption unit 43 in a cyclically repeated identification pattern/pattern recognizable for the terminal, to which the terminal can synchronize.

Like in the system 11, the checking unit 23 is provided to determine a value of the additional current consumption as a result of the activation of the current consumption unit 43 from a course of a value of the present current consumption measured by the current consumption measuring unit 19, in order to establish whether additional current consumption is taking place or has taken place, and, if this is the case, compare the additional current consumption of the circuit 55 to a value deposited e.g. in a register of the checking unit 23, if necessary, in order to check and determine an authenticity feature of the circuit according to the present invention in the chip 55. It is conceivable that the checking unit 23 gets to know about the imminent current increase or the pattern time instant of the additional current consumption from an indication signal received from the chip 15 and forwarded from the terminal processing unit 17 and determines whether the current consumption of the electric circuit is increased in a predetermined time frame, such as between a predetermined time duration prior to the pattern time instant and a predetermined time duration after the pattern time instant, in order to determine authenticity of the electric circuit depending on the height of the additional current consumption by which the current consumption of the electric circuit is increased, if necessary. Alternatively, the terminal 53 has a clock supply unit, such an oscillator, wherein a synchronizing unit 23 determines the pattern time instant, in which the additional current consumption to be checked is to be expected, based on the clock and information on the beginning of the terminal session it has received e.g. via a connection, not shown, from the terminal processing unit 17. For example, the terminal 13 and the chip 15 determine the pattern time instant independently of each other to be a predetermined number of clock cycles after the terminal session beginning.

In the other previously mentioned embodiment of sending out repetitive patterns or identification patterns by the chip as superpositions of the normal current consumption with additional current consumption, for example, the checking unit 23 analyzes the course of the present current consumption of the chip 55, to check the presence of superpositions of the normal current consumption with additional current consumption in form of the identification patterns by correlation of the current consumption profile with a predetermined identification pattern profile, for example, or synchronize itself to the occurrence of future superpositions based on such a procedure, to thereby predict future pattern time instants. The checking unit 23 then checks the present current consumption of the circuit 55 by means of the current consumption measuring unit 19 at the pattern time instant or a time instant lying before or after the pattern time instant by a time interval defined by the predetermined time frame, for example by comparison between the current consumption of the electric circuit 55 prior to the pattern time instant and after the pattern time instant, in order to check the authenticity of the circuit 55 as previously described. The further processes in the terminal 53 then take place like in the terminal 13 shown in FIG. 1 according to the present invention.

It is advantageous in the system 51 according to the present invention shown in FIG. 2 that the terminal 53 according to the present invention can be implemented by simply retrofitting an already existing terminal with the checking unit 23. Here, the checking unit 23 may even be implemented in an already existing, logic processing unit, for example, by changing a program defining a course of the command series performed by the processing unit. Exchange of the hardware of the already installed terminal is not necessary here.

The current consumption unit 43 on the chip 15, 55, may be implemented as an arbitrary circuit, such as a load transistor, an ohmic resistor connected in series to a switch, wherein flow of data between the terminal and the electric circuit in a case of the activation of the current consumption unit 43 in the terminal session is equal to a flow of data between the terminal 13, 53 and the electric circuit 15, 55 in a case of the activation missing. It is also conceivable that the additional current consumption generated by the current consumption unit 43 is adjustable, so that the current consumption unit may for example be implemented as a current consumer programmable to a value or a plurality of values or steps on a security controller. Here, the current consumer could be embodied as an additional circuit on the security controller, wherein the current consumption achieved by this circuit should be as constant as possible.

It also is conceivable that the terminal 13, 53 transmits information on a value of the additional current consumption to the chip 15, 55 via the activation signal, and the current consumption unit adjusts the additional current consumption depending on the information transmitted via the activation signal, such as to a fixed value or a second value different from the first value, or in a plurality of steps.

The triggering unit 57 on the chip 55 may be implemented as an arbitrary unit activating the current consumption unit, coupled to the operation unit 41, for example, and activating the current consumption unit 43 if the operation unit 41 performs a certain logic operation, or e.g. after a predetermined time interval after the chip 55 was supplied with a voltage, activates the current consumption unit 43 or also activates and/or deactivates the current consumption unit 43 in a predetermined periodic sequence, wherein the current consumption unit 43 no longer causes additional current consumption upon deactivating.

It is also possible that the triggering unit 57 transmits a value of the additional current consumption, by which the current consumption unit 43 is to increase the current consumption of the chip 15, 55, via the trigger signal to the current consumption unit 43. As an alternative hereto, the triggering unit 57 could also activate the current consumption unit 43 so that the current consumption unit 43 adjusts the current consumption and/or the additional current consumption to a first or an arbitrary number of values in a temporally predefined sequence or in a pattern predictable for the terminal. Here, it is also conceivable that the triggering unit activates the current consumption unit so that the current consumption unit adjusts and/or changes the additional current consumption according to a periodic sequence.

In the system 11, 51, the value of the additional current consumption could comprise information on an authenticity feature here, so that a first authenticity feature is associated with a first value of the additional current consumption, and a second authenticity feature of the circuit is associated with a second value of the additional current consumption, or a corresponding temporal sequence of the values of the additional current consumption could be associated with a single authenticity feature, so that the authenticity feature transmitted to the terminal from the electric circuit can be checked more accurately.

As an alternative to the implementation shown in FIG. 1, the operation unit 41 and the current consumption unit could also be implemented on several chips or even be implemented in a discrete circuit. As an alternative to the embodiment shown in FIG. 2, the operation unit 41, the current consumption unit 43, and the triggering unit 57 could also be implemented on several chips or even be implemented in a discrete circuit. Moreover, the tasks of the checking unit could each be taken over by the operation unit of the electric circuit.

In the terminal 13, 53, the current measuring unit 19 may be implemented as an arbitrary unit determining current consumption of the chip 15, 55, such as a voltage measuring device determining a voltage drop at a sense or measurement resistor connected into a sense or measurement path and connected to the terminal circuit supply port 33 in electrically conducting manner. Any unit determining current consumption of the terminal 13 and detecting current consumption of the circuit attached to the terminal or the chip 15, 55 attached at the terminal from the current consumption of the terminal 13 also are alternatives hereto.

In the terminal 13, the terminal processing unit 17, the activation unit 21, and the checking unit 23 can be implemented in arbitrary circuit elements, wherein implementation of the terminal processing unit 17, the activation unit 21, and the checking unit 23 on a single microprocessor or in an arbitrary logic circuit also is conceivable, for example. In the terminal 53, the terminal processing unit 17 and the checking unit 23 could also be implemented in arbitrary forms, such as in a microprocessor or in an arbitrary logic circuit.

The terminal 13, 53 could be implemented as a money-card reader, a mobile phone or an arbitrary device communicating with the electric circuit on the chip 15, 55 in the terminal session.

In the system 11, 51 according to the present invention, only the ground ports 29, 45 and the supply ports 33, 49 could alternatively be connected to each other, while the terminal 13, 53 communicates with the electric circuit on the chip 15, 55 in contact-free manner, for example, wherein it would alternatively even be conceivable that the terminal 13, 53 and the chip 15, 55 interact in completely contact-free manner, and the terminal 13, 53 detects power consumed by the chip 15, 55 from power consumption from the electromagnetic field by the chip 15, 55 and determines therefrom whether the chip has additional current consumption or additional power consumption or not. Momentary heat development or heat radiation of the chip could also be used as a measure of the momentary current consumption of the electric circuit in the chip by the terminal. The electric connections between the ground ports 29, 45 and the supply ports 33, 49 may be formed so that they can be built up or created by a mechanical process, such as inserting a card on which the electric circuit is applied into a terminal housing, and be interrupted when the card is ejected again.

It is explicitly pointed out again that the check of the chip for authenticity according to the embodiments outlined above is, if necessary, only based on the check of the occurrence of the additional current consumption expected by the terminal, without taking an explicit time of occurrence or intensity or strength of occurrence into consideration. Alternatively, the check for authenticity may of course also additionally be made dependent on whether the occurred additional current consumption occurs at a correct time instant and/or in correct amount or strength, as it has been described previously.

The checking unit 23 may be embodied as an arbitrary unit reading out a value of the current consumption from the current consumption measuring unit 19 and checking whether the electric circuit has the additional current consumption, and checking authenticity of the electric circuit on the basis of the additional current consumption if the current consumption of the electric circuit has the additional current consumption, a first value of the additional current consumption being associated with a first authenticity feature of the electric circuit and a second value of the additional current consumption with a second authenticity feature, for example, or a plurality of different values of the additional current consumption each being associated with a plurality of different authenticity features each.

As an alternative hereto, however, the checking unit could also read out a temporal or periodically repeating sequence of changes of the value of the current consumption of the electric circuit 15, 55 from the current consumption measuring unit 19 and determine an authenticity feature of the electric circuit 15, 55 based on the time sequence of the values of the additional current consumption.

Depending on the conditions, both the method of operating a terminal for the communication with an electric circuit as well as the method of operating an electric circuit for the communication with a terminal may be implemented in hardware or in software. Here, the implementation may be on a digital storage medium, in particular a floppy disk, an EEPROM (EEPROM=electrical erasable programmable read-only memory), an EPROM (EPROM=erasable programmable read-only memory), a DVD or a CD with electronically readable control signals capable of interacting with a programmable computer system, so that the corresponding methods are executed. In general, the invention thus also consists in a computer program product with program code stored on a machine-readable carrier for performing the inventive method, when the computer program product is executed on a computer. In other words, the invention may thus also be realized as a computer program with program code for performing the method, when the computer program is executed on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A system, comprising:
   a terminal;
   an electric circuit configured to communicate with the terminal during a terminal session, comprising:
   an operation unit comprising a processor programmed to execute a program of logic operations executing a bi-directional communication with the terminal during the terminal session; and
   a current consumer, which is activatable to perform electric processes which cause additional current consumption of the electric circuit,
   wherein the electric circuit comprises an authenticity feature which allows the terminal to check a genuineness of the electric circuit in that the processor is responsive to receiving an activation signal from the terminal to preliminarily interrupt the execution of the program in order to activate the current consumer so that logic data sent within the bi-directional communication from the electric circuit to the terminal is uninfluenced by the electrical processes of the current consumer activated by the processor responsive to the activation signal, and that no logic state is stored in non-volatile manner depending on the electrical processes of the current consumer activated by the processor responsive to the activation signal so that an initial logic state of the electric circuit at the beginning of a subsequent terminal session is independent from the electrical processes of the current consumer activated by the processor responsive to the activation signal;
   and the terminal, comprising:
   a supply port configured to externally, via contacts or via a wire-less connection, provide electrical power to the electric circuit during the terminal session;
   an activator configured to transmit the activation signal to the electric circuit, the activation signal being a command comprising a parameter for adjusting an additional current consumption of the electric circuit;
   a current consumption meter coupled to the supply port and configured to measure the power provided to the electric circuit; and
   a checker, coupled to the current consumption meter, configured to check the power supplied to the electric circuit whether the current consumption of the electric circuit is superimposed by the additional current consumption as adjusted by the parameter, by correlating the power supplied with an identification pattern corresponding to the additional current consumption as adjusted by the parameter,
   and to approve authenticity of the electric circuit if the current consumption of the electric circuit is superimposed by the additional current consumption as adjusted by the parameter, and deny the authenticity of the electric circuit if the current consumption of the electric circuit is not superimposed by the additional current consumption as adjusted by the parameter.

2. The system of claim 1, wherein the current consumer comprises a current scrambling unit comprising a plurality of load transistors configured to cause the additional current consumption upon activation by the processor, wherein the processor is also configured to activate the current scrambling unit during cryptographic computations involved by the logic operations in order to mask a current consumption of the cryptographic computations.

3. The system of claim 1, wherein the bi-directional communication with the terminal during the terminal session involves operation unit is configured to perform an authentication or encryption against the terminal which in uninfluenced be the electric processes of the current consumer.

4. The system of claim 1, wherein the operation unit is configured to continue the logical operations during the current consumer being activated by the terminal.

5. The system according to claim 1, wherein the checker is configured to, if the check reveals that the electric circuit is not authentic, prevent the terminal from performing safety-critical functions otherwise occurring during the terminal session, cancel a terminal's execution of safety-critical functions involved within the terminal session, or immediately cancel execution of the terminal session.

6. The system according to claim 1, wherein the terminal is configured to clock the electric circuit at a constant clock rate.

7. The system of claim 1, wherein the activator is also configured to transmit a time information concerning time duration, onset or termination of the additional current consumption to the electric circuit via the activation signal, and the checker is configured to check as to whether a time of occurrence of additional current consumption within the current consumption of the electric circuit matches the time information.

8. The system according to claim 1, wherein the activation signal is a command comprising a parameter for adjusting the additional current consumption of the current consumer, and the processor is configured to activate the current consumer in a manner depending on the parameter.

9. The system of claim 1, wherein the parameter adjusts an amount of the additional current consumption.

10. The system of claim 1, wherein the operation unit and the current consumer are both implemented on one chip.

11. The system of claim 1, wherein the operation unit is configured such that a flow of data from the electric circuit to the terminal after the activation of the current consumer is equal to a flow of data between the terminal and the electric circuit if the activation would not have been present.

12. The system of claim 1, wherein the operation unit is embodied as a security controller.

13. The system of claim 1, wherein the electric circuit is implemented on a chip deposited on a card for the execution of user-specific operations.

14. The system of claim 1, wherein the terminal is configured to provide a signal to the electric based on which the clock of the clock provider is generated.

15. A method for checking an authenticity of an electric circuit in a communication between the electric circuit and a terminal during a terminal session, wherein the electric circuit comprises an operation unit comprising a processor programmed to execute a program of logic operations executing a bi-directional communication with the terminal during the terminal session, and a current consumer, which is activatable to perform electric processes which cause additional current consumption of the electric circuit, the method comprising:

externally providing, from a supply port of the terminal, via contacts or via a wire-less connection, electrical power to the electric circuit during the terminal session;

transmitting an activation signal from the terminal to the electric circuit, the activation signal being a command comprising a parameter for adjusting an additional current consumption of the electric circuit, the processor being responsive to the activation signal from the terminal by preliminarily interrupting the execution of a program in order to activate the current consumer so that logic data sent within the bi-directional communication from the electric circuit to the terminal is uninfluenced by the electrical processes of the current consumer activated by the processor responsive to the activation signal, and that no logic state is stored in non-volatile manner depending on the electrical processes of the current consumer activated by the processor responsive to the activation signal so that an initial logic state of the electric circuit at the beginning of a subsequent terminal session is independent from the electrical processes of the current consumer activated by the processor responsive to the activation signal, measuring, by a current consumption meter of the terminal coupled to the supply port, the power provided to the electric circuit;

checking the power supplied to the electric circuit and measured by the current consumption meter whether the current consumption of the electric circuit is superimposed by the additional current consumption as adjusted by the parameter, by correlating the power supplied with an identification pattern corresponding to the additional current consumption as adjusted by the parameter, and approving the authenticity of the electric circuit if the current consumption of the electric circuit is superimposed by the additional current consumption as adjusted by the parameter, and deny the authenticity of the electric circuit if the current consumption of the electric circuit is not superimposed by the additional current consumption as adjusted by the parameter.

16. A non-transitory computer-readable storage medium having stored thereon a computer program with program code for performing, when the computer program is executed on a computer, a method for checking an authenticity of an electric circuit in a communication between the electric circuit and a terminal during a terminal session, wherein the electric circuit comprises an operation unit comprising a processor programmed to execute a program of logic operations executing a bi-directional communication with the terminal during the terminal session, and a current consumer, which is activatable to perform electric processes which cause additional current consumption of the electric circuit, the method comprising:

externally providing, from a supply port of the terminal, via contacts or via a wire-less connection, electrical power to the electric circuit during the terminal session;

transmitting an activation signal from the terminal to the electric circuit, the activation signal being a command comprising a parameter for adjusting an additional current consumption of the electric circuit, the processor being responsive to the activation signal from the terminal by preliminarily interrupting the execution of a program in order to activate the current consumer so that logic data sent within the bi-directional communication from the electric circuit to the terminal is uninfluenced by the electrical processes of the current consumer activated by the processor responsive to the activation signal, and that no logic state is stored in non-volatile manner depending on the electrical processes of the current consumer activated by the processor responsive to the activation signal so that an initial logic state of the electric circuit at the beginning of a subsequent terminal session is independent from the electrical processes of the current consumer activated by the processor responsive to the activation signal, measuring, by a current consumption meter of the terminal coupled to the supply port, the power provided to the electric circuit;

checking the power supplied to the electric circuit and measured by the current consumption meter whether the current consumption of the electric circuit is superimposed by the additional current consumption as adjusted by the parameter, by correlating the power supplied with an identification pattern corresponding to the additional current consumption as adjusted by the parameter, and approving the authenticity of the electric circuit if the current consumption of the electric circuit is superimposed by the additional current consumption as adjusted by the parameter, and deny the authenticity of the electric circuit if the current consumption of the electric circuit is not superimposed by the additional current consumption as adjusted by the parameter.

* * * * *